J. H. Smith,
Bake Pan.

No. 105,991. Patented Aug. 2, 1870.

Witnesses:
Alex. J. Roberts
L. S. Mabee

Inventor:
J. H. Smith
per Munn & Co.
Attorneys.

UNITED STATES PATENT OFFICE.

JOHN HARRY SMITH, OF BROOKLYN, NEW YORK.

IMPROVEMENT IN CAKE-PANS.

Specification forming part of Letters Patent No. 105,991, dated August 2, 1870.

*To all whom it may concern:*

Be it known that I, JOHN HARRY SMITH, of Brooklyn, in the county of Kings and State of New York, have invented a new and useful Improvement in Cake-Pans; and I do hereby declare that the following is a full, clear, and exact description thereof, which will enable others skilled in the art to make and use the same, reference being had to the accompanying drawings, forming part of this specification.

This invention relates to improvements in cake-pans; and it consists in improvements in the manufacture of cake-pans, whereby a deep-stamped octagonal pan with nearly vertical sides is produced from a disk of sheet metal, as hereinafter more fully specified.

Figure 2:
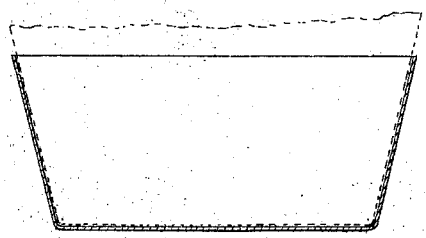
Figure 1:
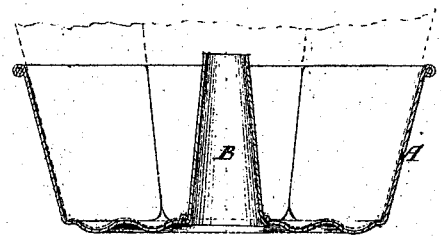
Figure 3:
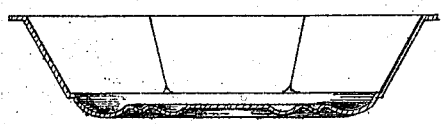

Figure 1 is a sectional elevation of a pan constructed according to my improvements, and Fig. 2 is a section of the pan in the form to which I reduce it previous to the finishing operation. Fig. 3 is a section of an octagonal pan such as now made.

Similar letters of reference indicate corresponding parts.

Cake and other octagonal pans have heretofore been made from one sheet or disk of metal struck up in dies; but they have been very shallow, and the angle formed by the sides and bottom has been very obtuse, owing to the inability, up to the present time, of manufacturers of these goods to stamp them deeper and with more nearly vertical sides in this form without tearing and breaking the metal. All octagonal pans made up to this time have been struck wholly in octagonal dies, which cut and tear the metal at the corners, if attempts are made to continue the operation beyond one blow, to deepen them and change the form of the sides, or draw them more nearly to the vertical line than may be done by one or more blows of the drop or press. I have therefore adopted the plan of drawing the disk of metal first to the required depth and angle for the sides in circular dies by as many operations as may be preferred in the ordinary way of drawing them—that is, first drawing them a part of the required depth in dies of the size that the upper part of the pan is to have or a little larger, then subjecting them to smaller dies for the continuation of the drawing process, and so on, but preferably accomplishing the drawing into circular form, and to the required depth by two operations. Then I subject the circular pan A, Fig. 2, thus produced to one operation of a drawing process, having octagonal dies such as required for the frame of the finished pan. In this way I am enabled to produce a deep octagonal pan with nearly vertical sides, such as shown in the drawings, which has never before been produced by stamping or forming by dies.

The sectional Fig. 3 clearly represents the difference between the octagonal pans heretofore made and those which I produce in the manner herein described.

The ventilating-funnel B is attached, as in other pans, after the pan is shaped.

Having thus described my invention, I claim as new and desire to secure by Letters Patent—

A polygonal cake-pan, A, formed with nearly vertical sides and of a single sheet of metal, as specified.

J. HARRY SMITH.

Witnesses:
  GEO. W. MABEE,
  ALEX. F. ROBERTS.